United States Patent
Markyvech et al.

(10) Patent No.: US 6,561,948 B2
(45) Date of Patent: May 13, 2003

(54) CONTROL FOR TRANSMISSION SYSTEM UTILIZING CENTRIFUGAL CLUTCH

(75) Inventors: Ronald K. Markyvech, Allen Park, MI (US); Thomas A. Genise, Dearborn, MI (US)

(73) Assignee: Eaton Corporation, Cleveland, OH (US)

( * ) Notice: Subject to any disclaimer, the term of this patent is extended or adjusted under 35 U.S.C. 154(b) by 18 days.

(21) Appl. No.: 09/814,494

(22) Filed: Mar. 21, 2001

(65) Prior Publication Data

US 2002/0137595 A1 Sep. 26, 2002

Related U.S. Application Data

(60) Provisional application No. 60/255,358, filed on Dec. 13, 2000.

(51) Int. Cl.$^7$ .................................................. B60K 41/02
(52) U.S. Cl. ................................... 477/77; 477/175
(58) Field of Search ...................... 477/77, 155, 128, 477/116, 119, 117, 180, 143, 150, 162, 174, 175, 176; 330/278

(56) References Cited

U.S. PATENT DOCUMENTS

| | | | |
|---|---|---|---|
| 3,580,372 A | 5/1971 | Schiefer et al. | |
| 3,696,901 A | 10/1972 | Henry | |
| 3,810,533 A | 5/1974 | Densow | |
| 4,081,065 A | 3/1978 | Smyth et al. | |
| 4,361,060 A | 11/1982 | Smyth | |
| 4,576,263 A | 3/1986 | Lane et al. | |
| 4,610,343 A | 9/1986 | Hikari | |
| 4,646,891 A | 3/1987 | Braun | |
| 4,651,855 A | 3/1987 | Grunberg | |
| 4,662,494 A | * 5/1987 | Wakiya et al. | 477/77 |
| 4,819,779 A | 4/1989 | Nickel et al. | |
| 4,850,236 A | 7/1989 | Braun | |
| 5,370,013 A | 12/1994 | Reynolds et al. | |
| 5,437,356 A | 8/1995 | Lohr | |
| 5,439,428 A | 8/1995 | Slicker | |
| 5,441,137 A | 8/1995 | Organek et al. | |
| 5,509,867 A | 4/1996 | Genise | |
| 5,730,269 A | 3/1998 | Hersey | |
| 5,827,153 A | * 10/1998 | Yasue et al. | 477/77 |
| 5,980,428 A | * 11/1999 | Liu | 477/180 |
| 6,018,703 A | * 1/2000 | Dodd | 330/278 |
| 6,022,295 A | 2/2000 | Liu | |
| 6,113,516 A | 9/2000 | Janecke | |
| 6,149,545 A | 11/2000 | Genise et al. | |
| 6,152,275 A | * 11/2000 | Fischer et al. | 477/174 |

FOREIGN PATENT DOCUMENTS

JP   3125030   * 5/1991

* cited by examiner

*Primary Examiner*—Christopher P. Schwartz
*Assistant Examiner*—Melanie Torres
(74) *Attorney, Agent, or Firm*—Kevin M. Hinman; Howard D. Gordon

(57) ABSTRACT

A control system/method for controlling a vehicle drivetrain (10) including an engine (18), a transmission (12) and, a centrifugal clutch (20) for drivingly coupling the engine output (136) to the transmission input shaft (28) during vehicle launch. A system controller (50) issues command output signals (56) for controlling engine speed (ES) on a closed loop basis.

22 Claims, 9 Drawing Sheets

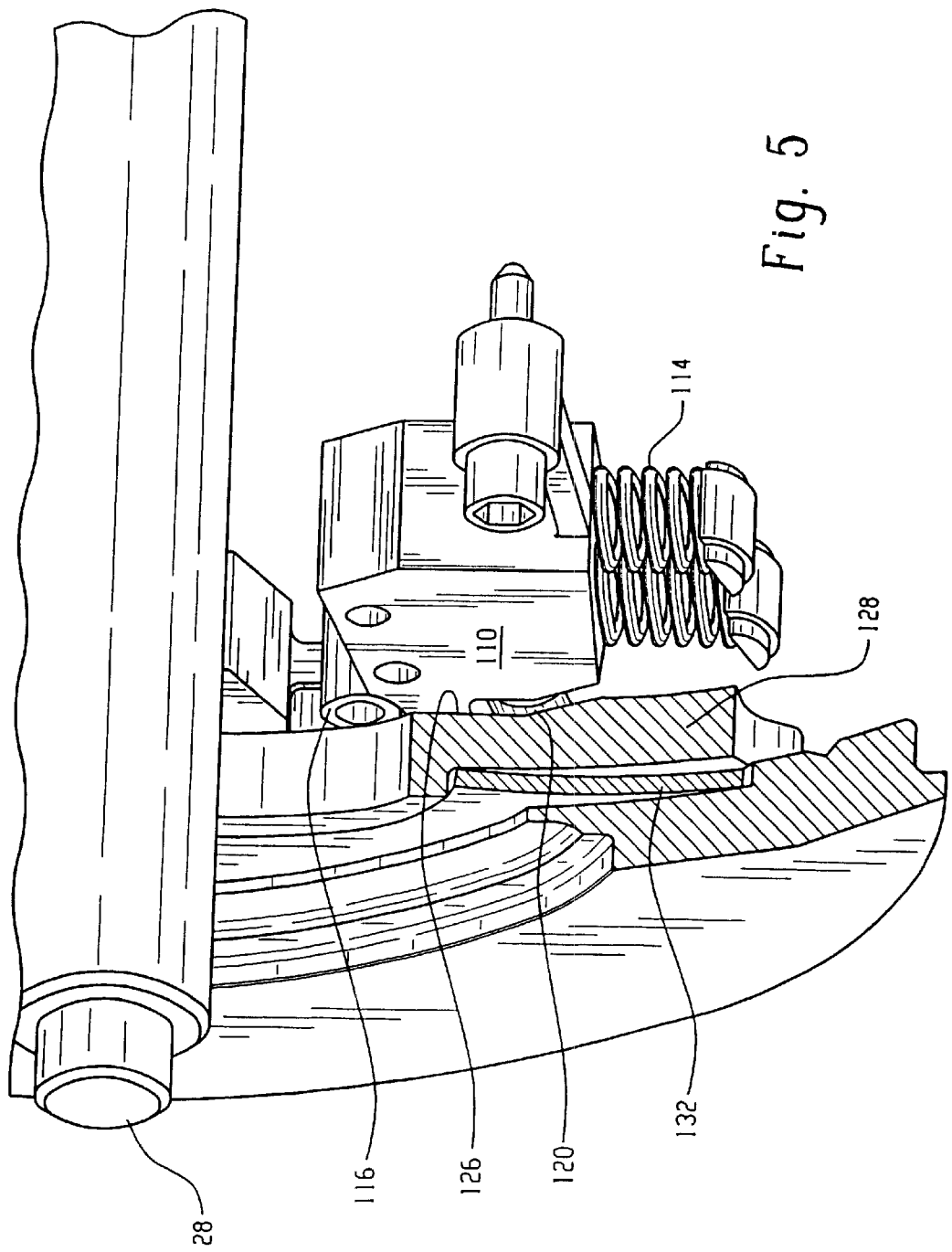

CONTROL FOR TRANSMISSION SYSTEM UTILIZING CENTRIFUGAL CLUTCH

RELATED APPLICATIONS

This application is a continuation-in-part of provisional application No. 60/255,358 filed Dec. 13, 2000.

This application is related to U.S. Ser. No. 09/(99-rCLU-058) titled: TRANSMISSION SYSTEM UTILIZING CENTRIFUGAL CLUTCH and U.S. Ser. No. 09/(00-rTRN-403) titled: CENTRIFUGAL CLUTCH, both assigned to EATON CORPORATION, assignee of this invention, and both filed the same day as this application.

BACKGROUND OF THE INVENTION

1. Field of the Invention

The present invention relates to a centrifugal master clutch and a vehicular transmission system utilizing same. In particular, the present invention relates to an automated vehicular transmission system comprising an engine, a multiple ratio transmission, a centrifugally operated master friction clutch for drivingly coupling the engine to the transmission and a controller for controlling fueling of the engine during vehicle launch conditions, as a function of throttle position and other sensed system operating conditions such as at least one of engine speed, transmission input shaft speed, transmission output shaft speed, engine torque and engaged gear ratio.

More particularly, a preferred embodiment of the present invention relates to a start control method/system for a vehicular automated mechanical transmission system utilizing a centrifugal master friction clutch controlled solely by engine speed and a controller for controlling engine fueling during vehicle launch conditions.

2. Description of the Prior Art

Automated mechanical transmission systems not requiring the vehicle driver or operator to operate the vehicle master clutch (so called "two-pedal systems"), and clutch controls and actuators therefore, are known in the prior art as may be seen by reference to U.S. Pat. Nos. 4,081,065; 4,361,060; 4,936,428; 5,439,428; 5,634,867; 5,630,773; 5,960,916 and; 5,947,847, the disclosures of which are incorporated herein by reference. These systems are not totally satisfactory as separate clutch actuators, sensors and/or, electrical and/or fluid power (i.e., compressed and/or hydraulic) connections thereto are required which adds to the expense of providing, assembling and maintaining such systems.

Centrifugally operated friction clutches are well known in the prior art and typically include a driving input member driven by a prime mover, usually an electric motor or internal combustion engine, and weights rotatable with the driving member which, upon rotation of the driving member, will move radially outwardly under the effect of centrifugal force to cause the driving input member to frictionally engage a driven output member. Examples of centrifugally operated clutches may be seen by reference to U.S. Pat. Nos. 3,580,372; 3,580,372; 3,696,901; 5,437,356; 3,810,533; 4,819,779; 5,441,137; 5,730,269; and; 4,610,343, the disclosures of which are incorporated herein by reference.

Fully or partially automated mechanical transmission systems that, upon determining that a dynamic shift from a currently engaged ratio into neutral and then into a target ratio is desirable, will, while maintaining the vehicle master friction clutch engaged, initiate automatic fuel control to cause reduced torque across the jaw clutches to be disengaged, are known in the prior art as may be seen by reference to U.S. Pat. Nos. 4,850,236; 5,820,104; 5,582,558; 5,735,771; 5,775,639; 6,015,366; and 6,126,570, the disclosures of which are incorporated herein by reference. These systems include systems that attempt to fuel the engine to achieve a sustained zero driveline torque, and systems which force torque reversals, see U.S. Pat. No. 4,850,236. These systems, upon sensing a neutral condition, will, while maintaining the master clutch engaged, cause the engine to rotate at a speed determined to cause synchronous conditions for engaging the target ratio.

Vehicular driveline systems, especially for heavy-duty vehicles, utilizing centrifugal clutches have not been satisfactory as the engines were typically controlled by throttle device position, not on a closed loop basis based upon a target engine speed and/or engine torque, and thus did not provide acceptable control for smooth vehicle launch and low speed operation. Prior art vehicular driveline systems utilizing centrifugal master clutches where not provided with clutches having damage and/or overheating protection and/or were not configured to lock up and release at engine speeds selected to permit dynamic shifting with the master clutch engaged.

SUMMARY OF INVENTION

In accordance with the present invention, the drawbacks of the prior art are reduced or minimized by the provision of a centrifugal master friction clutch, and a vehicular automated transmission system utilizing same, which utilizes closed loop control to provide acceptable performance for heavy duty vehicle launch operations and low speed operation and is configured to allow dynamic shifting with the master clutch engaged. Preferably, the closed loop control will provide protection from damage and/or overheating.

The above is accomplished by providing a centrifugal clutch structure which will initially lockup at an engine speed below the speed at which upshifts are required and will not release from a lockup condition at engine speeds above (i) the highest speeds at which down shifts are required and (ii) the lowest allowable expected engine speed after completion of an upshift and by controlling fueling of the engine during launch to cause engine speed and/or engine torque to equal or not exceed a target value determined as a function of sensed input signal values indicative of two or more of throttle device position, engine speed, engine torque, transmission input shaft speed, transmission output shaft speed, transmission engaged ratio and clutch slip.

The centrifugal master clutch requires no external clutch actuator or sensor, and no connections to mechanical linkages, electrical power and/or fluid power.

Accordingly, it is an object of the present invention to provide a new and improved centrifugally operated vehicular master friction clutch and automated mechanical transmission system utilizing same.

This and other objects and advantages of the present invention will become apparent from a reading of the following description of the preferred embodiment taken in connection with the attached drawings.

BRIEF DESCRIPTION OF THE DRAWINGS

FIG. 5 is a partial sectional view of the roller, ramp, and clamp force limiting spring mechanism utilized with the centrifugal mechanism.

DESCRIPTION OF THE PREFERRED EMBODIMENT

Figure 1:
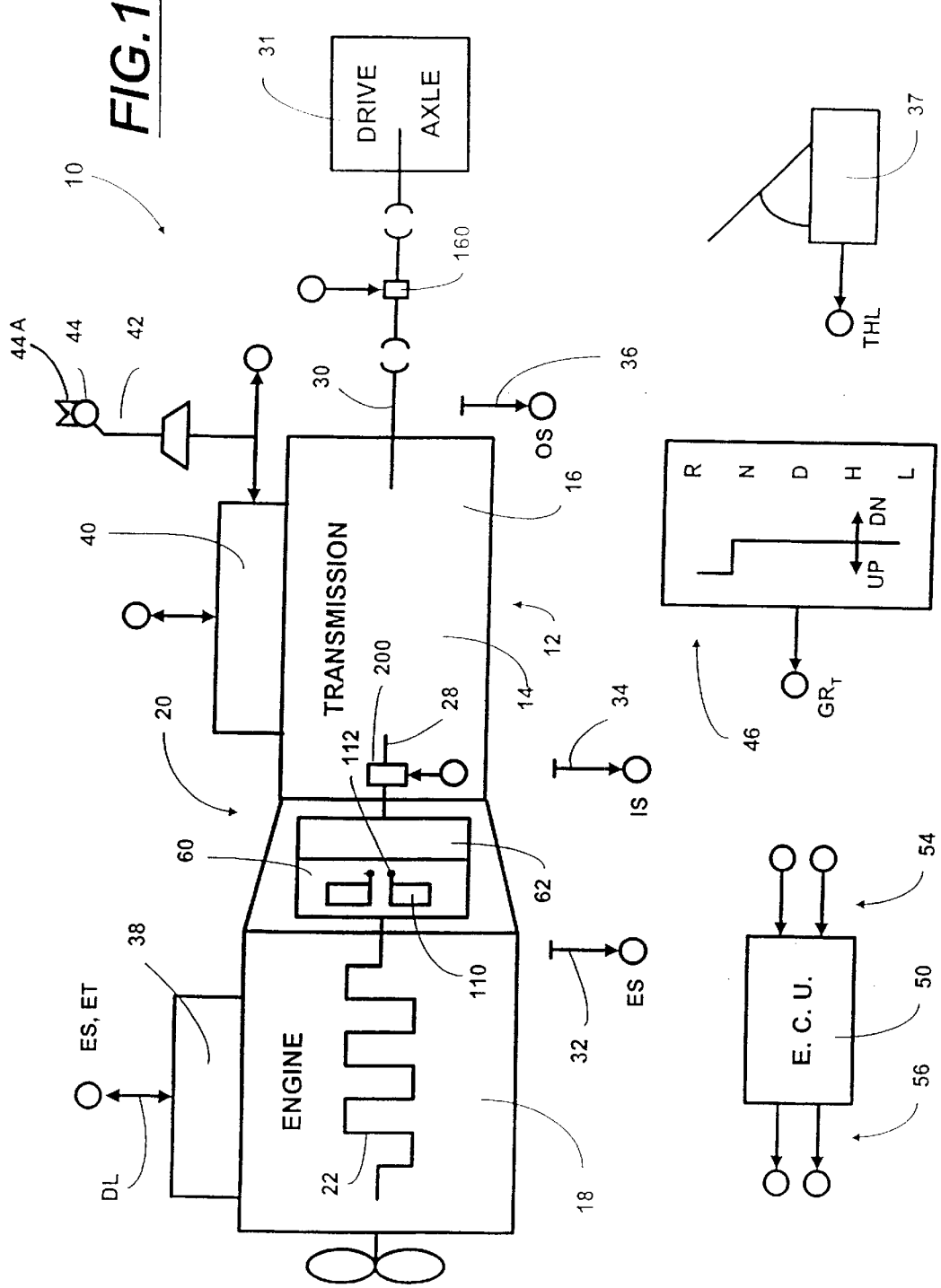
FIG. 1 is a schematic illustration of a vehicular drivetrain using the centrifugal clutch and engine fuel control of the present invention.

An at least partially automated vehicular drivetrain system 10 using the centrifugally operated friction master clutch and control of the present invention is schematically illustrated in FIG. 1. System 10 may be fully automated, as seen by way of example in U.S. Pat. No. 4,361,060, partially automated, as seen by way of example in U.S. Pat. Nos. 4,648,290 and 5,409,432, or manual with controller assist, as seen by way of example in U.S. Pat. Nos. 4,850,236; 5,582,558; 5,735,771; and 6,015,366.

In system 10, a change-gear transmission 12 comprising a main transmission section 14 connected in series with a splitter-type auxiliary transmission section 16 is drivingly connected to an internal combustion engine 18, such as a well-known gasoline or diesel engine, by the centrifugal master friction clutch 20 of the present invention. Transmissions 12, by way of example, may be of the type well known in the prior art and are sold by the assignee of this application, EATON CORPORATION, under the trademarks "Super-10" and "Lightning", and may be seen in greater detail by reference to U.S. Pat. Nos. 4,754,665; 6,015,366; 5,370,013; 5,974,906; and 5,974,354, the disclosures of which are incorporated herein by reference.

Engine 18 includes a crankshaft 22, which is attached to a driving member 60 of centrifugal master clutch 20, which frictionally engages with, and disengages from, a driven member 62, which is attached to the input shaft 28 of the transmission. A transmission output shaft 30 extends from the auxiliary transmission section 16 for driving connection to the vehicular drive wheels, as through a drive axle 31 or transfer case.

The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement.

As may be seen from FIG. 1, centrifugal clutch 20 requires no external clutch actuator and is operated as function of the rotational speed (ES) of the engine. Centrifugal clutch 20 also requires no connections to operating linkages, command signal inputs, power electronics and/or compressed air and/or hydraulic conduits. The most economical application of the present invention is with a dry clutch, however, the present invention is also applicable to wet clutch technology.

Transmission system 10 further includes rotational speed sensors 32 for sensing engine rotational speed (ES), 34 for sensing input shaft rotational speed (IS), and 36 for sensing output shaft rotational speed (OS), and providing signals indicative thereof. A sensor 37 provides a signal THL indicative of throttle pedal position or of torque demand. The signal is usually a percentage (0% to 100%) of fuel throttle position. Engine 18 may be electronically controlled, including an electronic controller 38 communicating over an electronic data link (DL) operating under an industry standard protocol such as SAE J-1922, SAE J-1939, ISO 11898 or the like.

An X-Y shift actuator, which by way of example may be of the types illustrated in U.S. Pat. Nos. 5,481,170; 5,281,902; 4,899,609; and 4,821,590, may be provided for automated or shift-by-wire shifting of the transmission main section and/or auxiliary section. Alternately, a manually operated shift lever 42 having a shift knob 44 thereon may be provided. Shift knob 44 may be of the type described in aforementioned U.S. Pat. No. 5,957,001. As is well known, shift lever 42 is manually manipulated in a known shift pattern for selective engagement and disengagement of various shift ratios. Shift Knob 44 may include an intent to shift switch 44A by which the vehicle operator will request automatic engine fueling control to relieve torque lock and allow a shift to transmission neutral. A shift selector 46 allows the vehicle driver to select a mode of operation and provides a signal $GR_T$ indicative thereof.

System 10 includes a control unit 50, preferably a microprocessor-based control unit of the type illustrated in U.S. Pat. Nos. 4,595,986; 4,361,065; and 5,335,566, the disclosures of which are incorporated herein by reference, for receiving input signals 54 and processing same according to predetermined logic rules to issue command output signals 56 to system actuators, such as engine controller 38, shift actuator 40, and the like.

As is known, to disengage a jaw clutch in a vehicular mechanical transmission, especially in a heavy-duty vehicle, it is necessary to relieve torque lock at the engaged jaw clutch. If opening the master friction clutch 20 is not desirable, torque lock can be relieved by fueling the engine to cause assumed zero driveline torque and/or by forcing torque reversals, which will positively cause crossings of zero driveline torque.

Fully or partially automated mechanical transmission systems that, upon determining that a shift from a currently engaged ratio into neutral and then into a target ratio is desirable, will, while maintaining the vehicle master friction clutch engaged, initiate automatic fuel control to cause reduced torque across the jaw clutches to be disengaged, are also known in the prior art as may be seen by reference to above-mentioned U.S. Pat. Nos. 4,850,236; 5,582,558; 5,735,771; 5,775,639; 6,015,366; and 6,126,570. Shifting with the master clutch remaining engaged is preferred in many situations, as such shifts tend to be of a higher shift quality and/or cause less wear on the driveline. These systems include systems that attempt to fuel the engine to achieve and maintain a zero driveline torque, see U.S. Pat. No. 4,593,580, the disclosure of which is incorporated herein by reference, and systems that fuel the engine to force one or more torque reversals, see U.S. Pat. No. 4,850,236. Upon sensing a transmission neutral condition, the clutch is maintained engaged and the engine speed commanded to a substantially synchronous speed for engaging a target gear ratio ($ES=OS \times GR_T$).

Control of engine torque to achieve a desired output or flywheel torque is known as and may be seen by reference U.S. Pat No. 5,620,392, the disclosure of which is incorporated herein by reference. Engine torque as used herein refers to a value indicative of an engine torque, usually gross engine torque, from which an output or flywheel torque may be calculated or estimated. The relationship of gross engine torque to flywheel torque is discussed in U.S. Pat. Nos. 5,509,867 and 5,490,063, the disclosures of which are incorporated herein by reference.

One or more engine torque's or torque limit values may be commanded on, or read from, an industry standard data link, DL, such as an SAE J-1922, SAE J-1939 or ISO11898 compliant datalink.

By way of example, datalinks complying to the SAE J1939 or similar protocol, allow the system controller 50 to issue commands over the datalink for the engine to be fueled in any one of several modes, such as (i) in accordance with the operators setting of the throttle, (ii) to achieve a commanded or target engine speed ($ES=ES_T$), (iii) to achieve a commanded or target engine torque ($ET=ET_T$) and (iv) to maintain engine speed and engine torque below limits ($ES<ES_{MAX}$ and $ET<ET_{MAX}$). Many input/informational signals, such as engine speed (ES), engine torque (ET), and the like may also be carried by the datalink.

The structure of the centrifugal clutch 20 will be described in greater detail below. Clutch 20 includes an input or driving portion 60 fixed for rotation with engine crankshaft 22 (usually at the engine flywheel), and an output or driven portion 62 fixed for rotation on transmission input shaft 28. As is known, rotation of the input member 60 will cause clutch 20 to engage and drivingly connect the engine output, usually an engine flywheel, or the like, to the transmission input shaft 28. The clamping force, and thus the torque transfer capacity of the clutch 20 is a function of rotational speed (ES) of engine 18 and clutch input member 60. The clutch 20 should reach incipient engagement slightly at an engine speed at greater than engine idle and should fully engage at an engine speed lower than the engine speed at which a first upshift is required. Unlike typical spring applied master friction clutches, which are normally engaged, clutch 20 is disengaged at lower engine speeds.

To allow proper vehicle launch and dynamic shifting with the master clutch engaged, clutch 20 once fully engaged, should remain fully engaged at engine speeds greater than (i) the highest expected speed at which downshifts are initiated and (ii) the minimum expected engine speed after an upshift. Incipient engagement is the initial torque transfer contact of clutch friction surfaces as may be seen by reference to U.S. Pat. Nos. 4,646,891 and 6,022,295, the disclosures of which are incorporated herein by reference. Logic for only initiating single or skip upshifts only if the expected engine speed at completion of the shift exceeds a minimum reference value may be seen by reference to U.S. Pat. Nos. 6,113,516 and 6,149,545, the disclosures of which are incorporated herein by reference.

Figure 2:
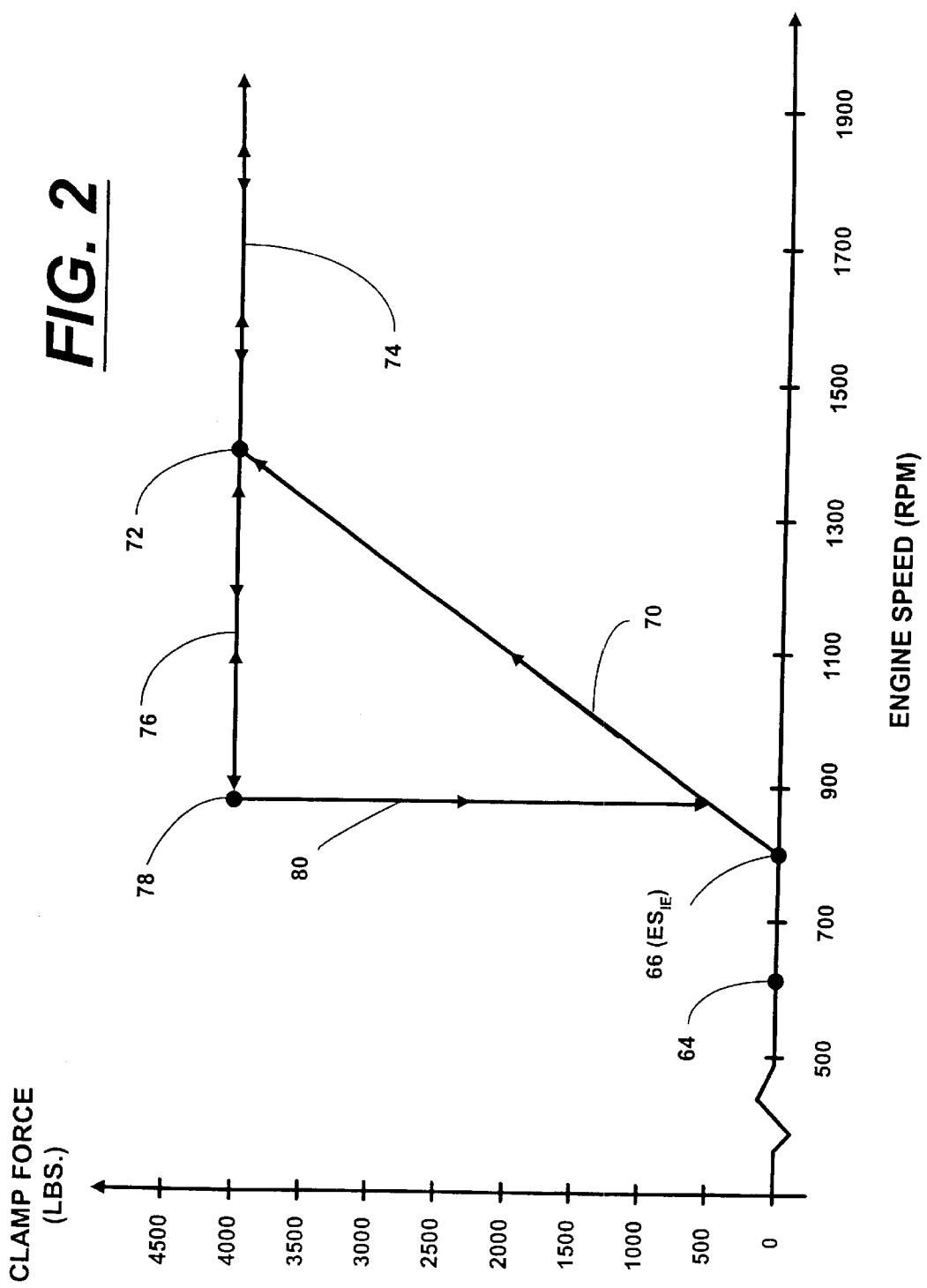
FIG. 2 is a schematic illustration, in graphical format, of the clamp force characteristics of the centrifugal clutch of the present invention at various engine speeds.

FIG. 2 is a graphical representation of the clamping force, of a preferred embodiment the clutch 20, and thus the torque transfer capacity, at various engine speeds.

In the illustrated example, system 10 is a heavy duty truck driveline, engine 18 is an electronically controlled diesel engine having an idle speed of about 600 RPM to 700 RPM, point 64, and a governed top speed of about 1800 RPM to 2000 RPM. In the preferred embodiment, the clutch 20 will move to incipient engagement at about 800 RPM, point 66 ($ES_{IE}$), which is slightly above idle, and will have an increasing clamp load, line 70, as engine speed increases. The clutch will be most fully engaged at or below the capped maximum clamp force, 4000 pounds, at about 1400 RPM, point 72. Once at maximum clamp load, which is selected to lock up the clutch under extreme conditions (i.e., substantially zero slip at considerably greater than expected torque loads), the clutch 20 will remain locked up, lines 74 and 76, until engine speed falls to less than about 850 RPM, point 78. At the release point, the clutch 20 will very rapidly disengage with decreasing engine speed, line 80, to prevent engine stalling.

850 RPM is below (i) the minimum engine speed at which downshifts will be commanded and (ii) the minimum expected engine speed at completion of an upshift at which an upshift, single or skip, will be initiated, see U.S. Pat. No. 6,149,545, the disclosure of which is incorporated herein by reference. Accordingly, a centrifugal clutch 20 having the performance characteristics indicated on FIG. 2, which will allow a smooth modulated vehicle launch, and will assure that the clutch remains engaged for dynamic upshifting and downshifting.

The structure of a preferred embodiment of centrifugal clutch 20 may be seen by reference to FIGS. 5, 6A, 6B, and 7. Clutch 20 includes a clutch bell housing assembly 100, friction disc assembly 102, intermediate pressure plate 104, and friction disc assembly 106. As is well known from conventional clutches, bell housing assembly 100 and intermediate pressure plate 104 mount to the engine flywheel for rotation therewith and comprise the driving portion 60 of the clutch, friction disc assemblies 102 and 106 are typically splined to transmission input shaft 28 and comprise the driven portion 62 of the clutch.

Figure 7:
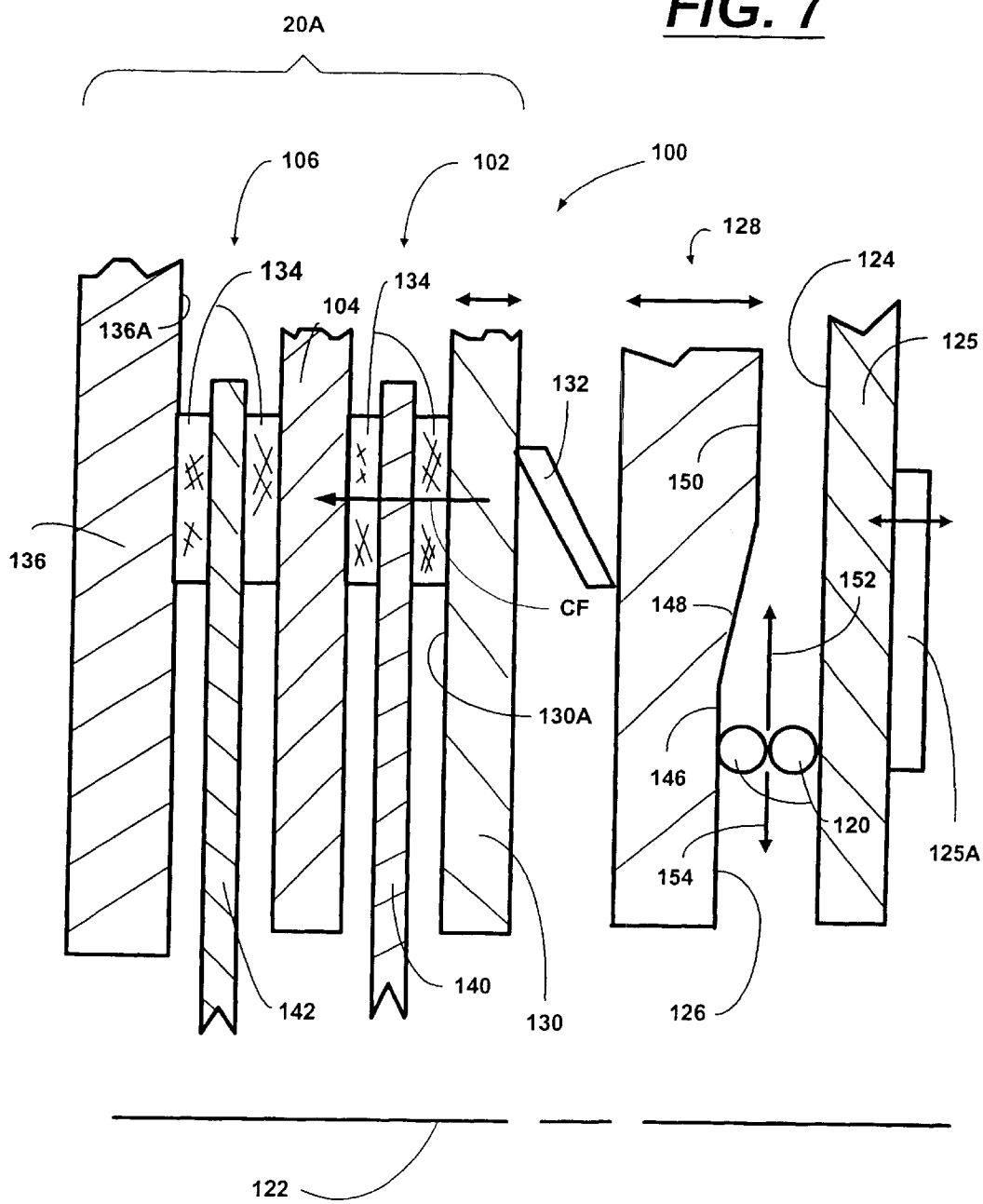
FIG. 7 is a schematic partial sectional view of the present invention.

Clutch portion 20A of clutch 20 may be similar in structure and function to corresponding portions of existing dual plate clutches. The bell housing assembly includes four flyweights 110, which are pivoted to the housing assembly at pivot pins 112. Return springs 114 bias the flyweights 110 radially inwardly to rest on stops 116 (see FIG. 6A). A stop member 118 limits the radially outward movement of the flyweights (see FIG. 6B). As the engine and the housing 100 rotate, the effect of centrifugal force will cause the flyweights 110 to move against the bias of springs 114 from the position of FIG. 6A to the position of FIG. 6B. The flyweights 110 each carry one or more rollers 120 or functionally similar wedging member, which will act between a reaction surface and a ramp to provide an axial clamping force for engaging the master friction clutch 20. FIG. 7 is a schematic illustration of the operational members acted upon by rollers 120. The members of the clutch 20 are shown in fragments as rotating about the rotational axis 122 of input shaft 28.

Rollers 120 are received between a substantially flat surface 124 of a fixed reaction plate 125 and a ramped surface 126 of an axially movable ramp plate 128. Alternatively, surface 124 could be ramped and/or the wedging member could be of a wedge configuration. Other wedging configurations may be utilized. The reaction plate 125 may be manually and/or automatically adjustable by an adjustment mechanism 125A to take up wear or the like. The ramp plate acts on an axially movable main pressure plate 130 through a preloaded spring member 132, which will limit the axial force applied to the main pressure plate 130 by the ramp plate. Main pressure plate 130 will apply a clamping force CF on the friction pads 134 of the friction plates which are trapped between surface 130A of the main pressure plate 130 and the intermediate pressure plate 104 and the intermediate pressure plate 104 and surface 136A of the engine flywheel 136.

The hub portions 140 and 142 of the friction plates 102 and 106, respectively, are adapted to be splined to input shaft 28 for rotation therewith while plates 125, 128, 130, and 140 rotate with the engine flywheel 136.

At rest, one of the rollers 120 will engage the recessed portion 146 of surface 126 and will not apply a leftward axial clamping force to the friction pads. As the roller travels sufficiently radially outwardly and onto the ramped portion 148 of the ramp surface 126, an increasing axial clamping force is applied (see line 70 on FIG. 2). As the roller moves further radially outwardly onto the flat extended portion of 150 of surface 126, the clamp force will remain at a capped value (see lines 74 and 76 of FIG. 2) as limited by preload spring 132. The flyweights 110 will hit stops 118 prior to full compression of springs 132. Applying force through a spring to limit the maximum force applied is known in the prior art as may be seen by reference to U.S. Pat No. 5,901,823.

A greater centrifugal force 152 is required to move rollers 120 up ramp portion 148 to flat portion 150 than is required to retain the rollers on the flat portion against the effect of spring force 154 from return springs 114. This accounts for the difference between the initial maximum clamp force engine RPM value, point 72 on FIG. 2, and the release engine RPM value, point 78 on FIG. 2. Back tapers and/or recesses may be added to surface 150 and or the inclination of ramp 148 and/or flat portion 150, the relative masses and/or the spring rate of spring 114 may be modified to change the engine speed of disengagement, point 78 on FIG. 2.

As is known, to launch a heavy duty vehicle, which will occur in a start ratio (i.e., at a relatively high ratio of input shaft speed to output shaft speed), less torque at the input shaft is required (for example, 600 to 900 lbs. ft., depending on grade) than to move the vehicle at high speeds. Typical heavy-duty vehicle diesel engines will have a maximum torque output of about 1400 to 2200 lb.-ft. at a maximum torque RPM.

For one embodiment of master friction clutch 20, 1000 lbs. of clamp force will provide a torque capacity of about 600 to 700 lbs. ft., while 4000 lbs. of clamp force will provide a torque capacity of about 3000 lbs. ft., which is well in excess of engine torque capacity and driveline capacity and provides a large margin of safety when the clutch is in the capped clamp load condition, lines 74 and 76 of FIG. 2.

At vehicle launch, i.e., when starting the vehicle from stop, the clutch 20 should lock up at between about 750 RPM and 950 RPM, depending if starting up a steep grade or in other high resistance conditions. In the vehicle launch mode i.e., when vehicle is stopped or at very low vehicle speed, clutch not fully engaged and start ratio engaged (Rev 1st, 2nd, 3rd or 4th in a 10 forward speed transmission), the control logic of the present invention will operate in a launch mode.

Figure 8A:
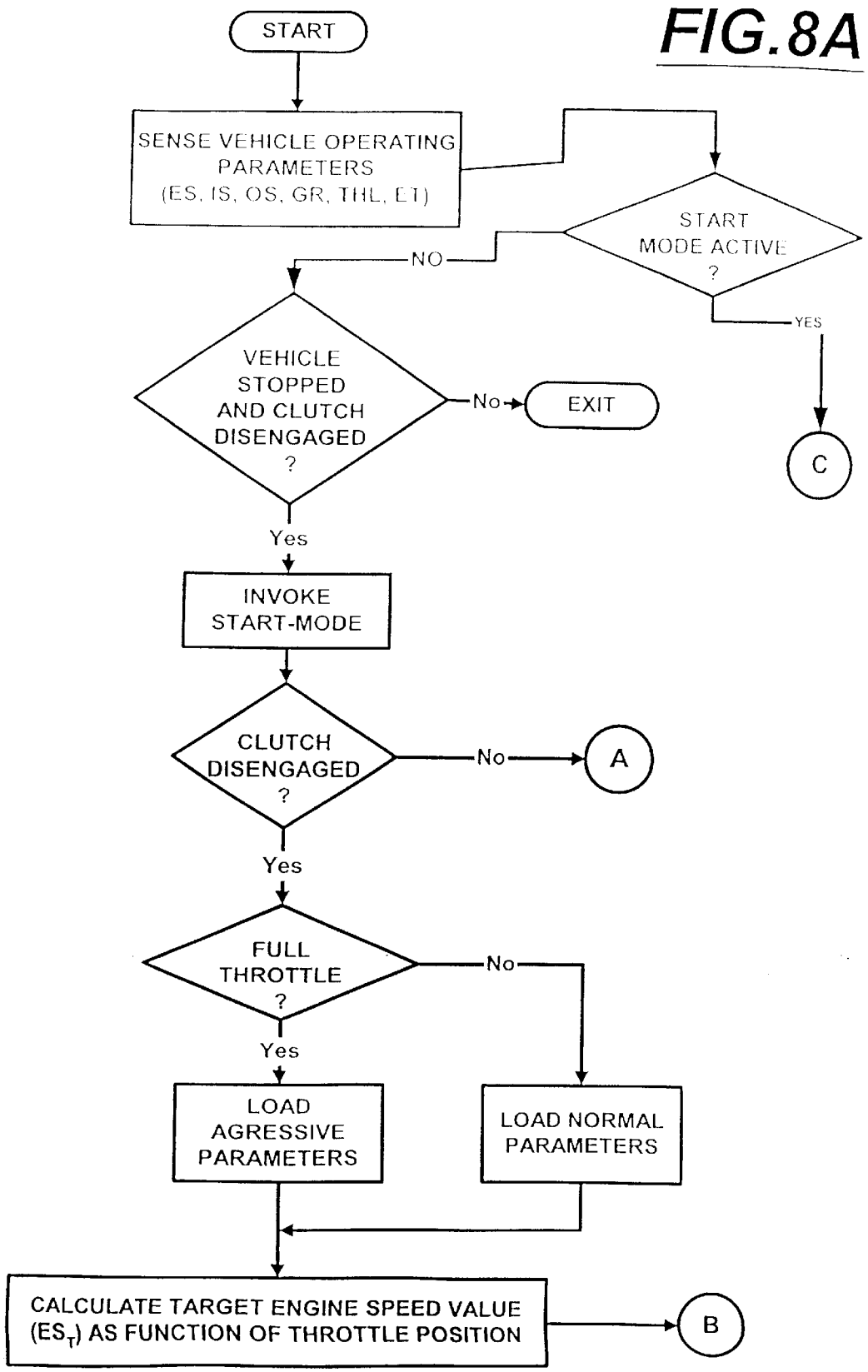
FIGS. 8A and 8B are schematic illustrations, in flowchart format, of the launch logic of the present invention.
Figure 8B:
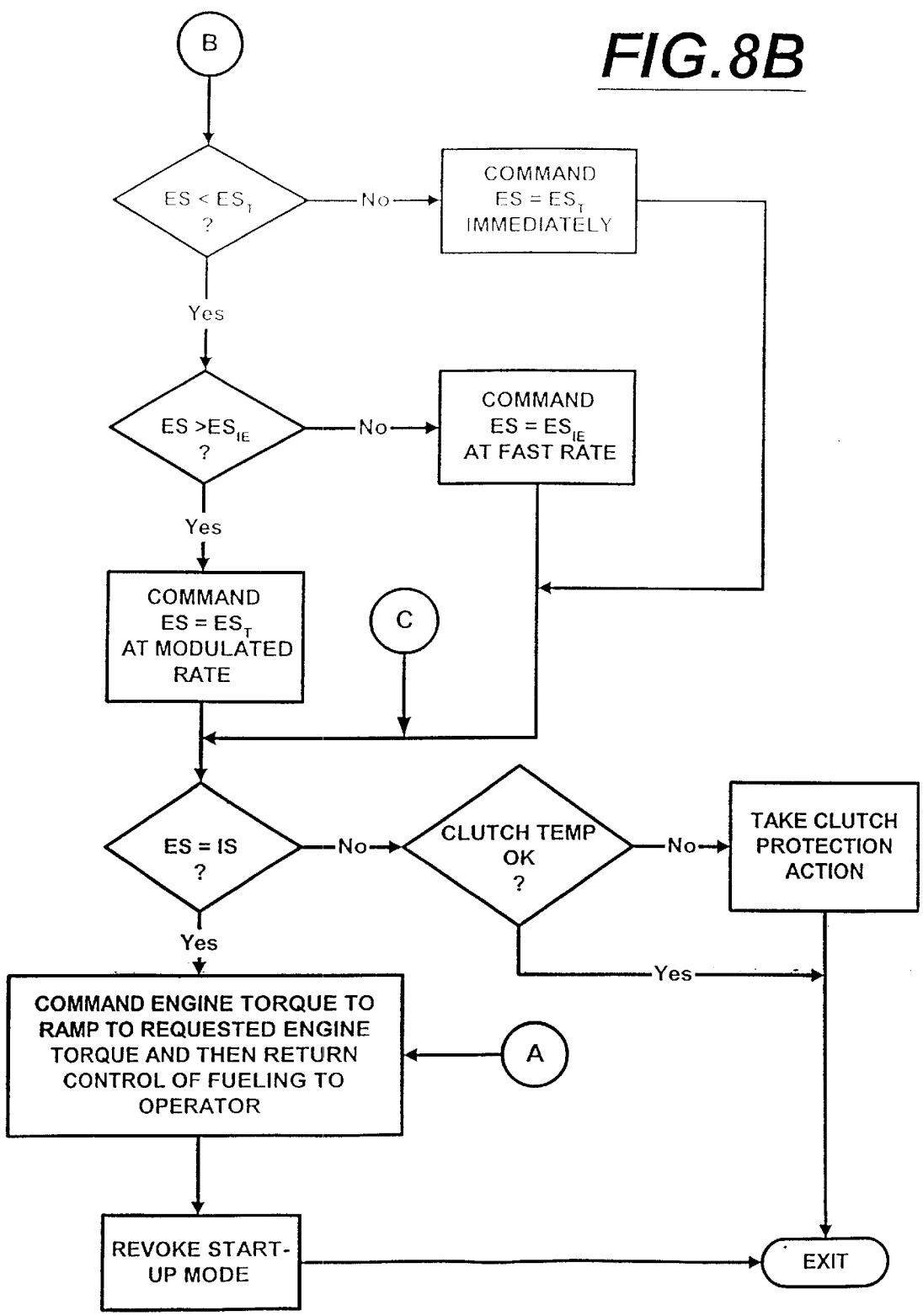

In the launch mode, the transition from disengagement to engagement of the centrifugal master clutch is dependent upon increasing engine speed. Without an engine speed controlling algorithm, the system is prone to abuse and harsh engagements by careless drivers since a rapid increase in engine speed is equivalent to "dumping" or "popping" the clutch in a conventional manual clutch arrangement. In the preferred embodiment of the present invention, by using the SAE J1939 communication link, the control algorithm uses the "speed and torque limit" mode to control engine speed and rate of change of engine speed during engagement. Once engagement is sensed, (by monitoring the decreasing difference between engine speed and input shaft speed), the algorithm switches to a controlled ramp up of regulated engine torque limit searching from existing engine torque at the point of full engagement. Once the torque has ramped back, full throttle control is returned to the driver. FIGS. 8A and 8B are a flow chart illustration of a preferred embodiment of the launch control of the present invention.

The centrifugal clutch 20 is designed to fully engage at an approximate engine RPM, (ex: 900 RPM). The algorithm uses a throttle position modulated engine speed limit, (ex: 750 RPM to 950 RPM), to control the engine speed during engagement. As an example, see FIG. 3, at 50% throttle position the engine speed would be limited to 850 RPM until engagement was sensed. At the point of engagement the actual engine torque value is captured and used as the starting point of the throttle "recovery phase". The J1939 "speed and torque limit" mode is used to ramp the torque limit up from the starting torque point to a final value. Torque will be ramped up at a rate, which may vary with throttle position and/or engaged gear ratio. The ramp up rate will preferably be selected to minimize driveline oscillations and avoid the natural frequencies of the driveline.

Figure 3:
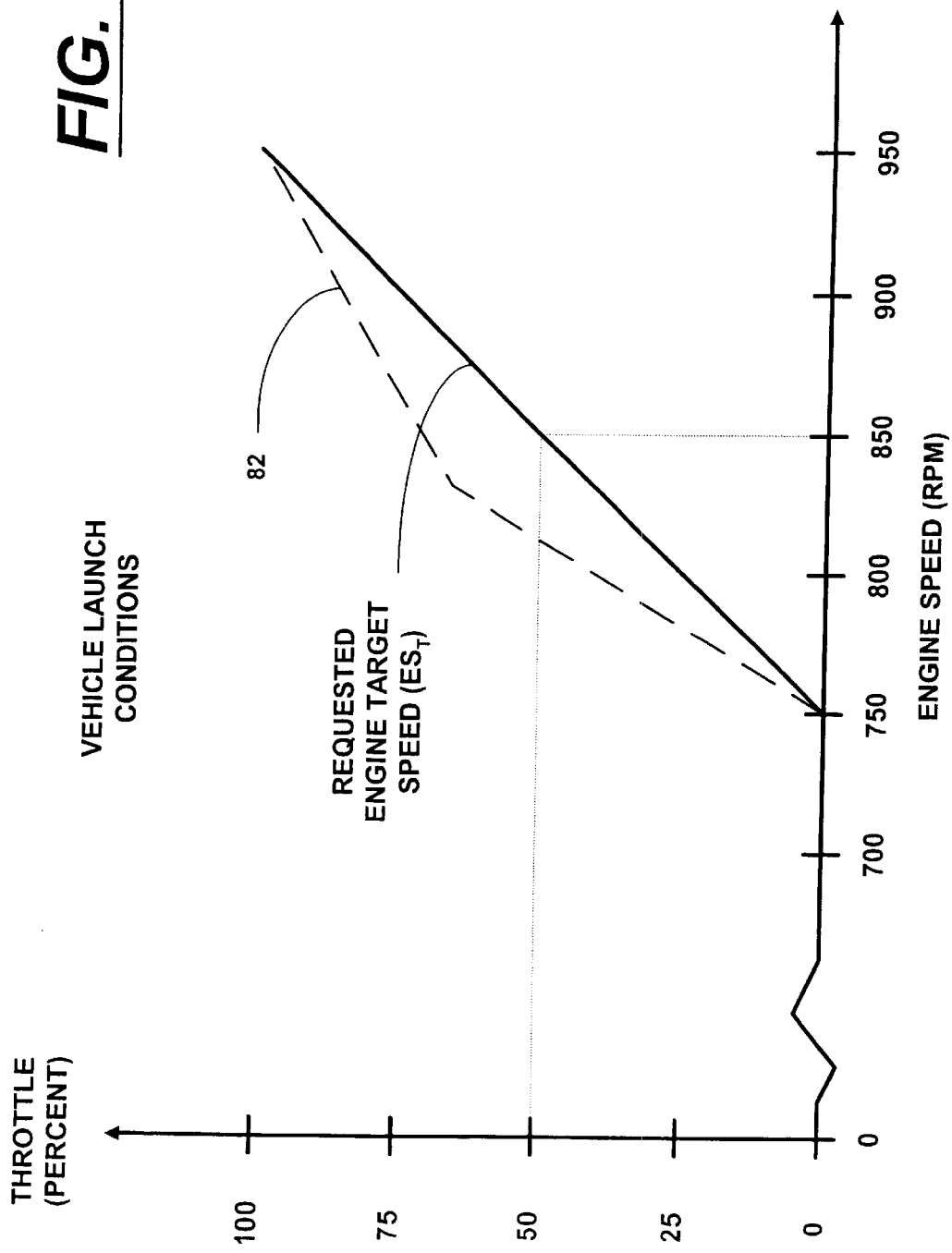
FIG. 3 is a schematic illustration, in graphical format, of target engine speeds for various throttle positions at vehicle launch for the system of the present invention.
Figure 4:
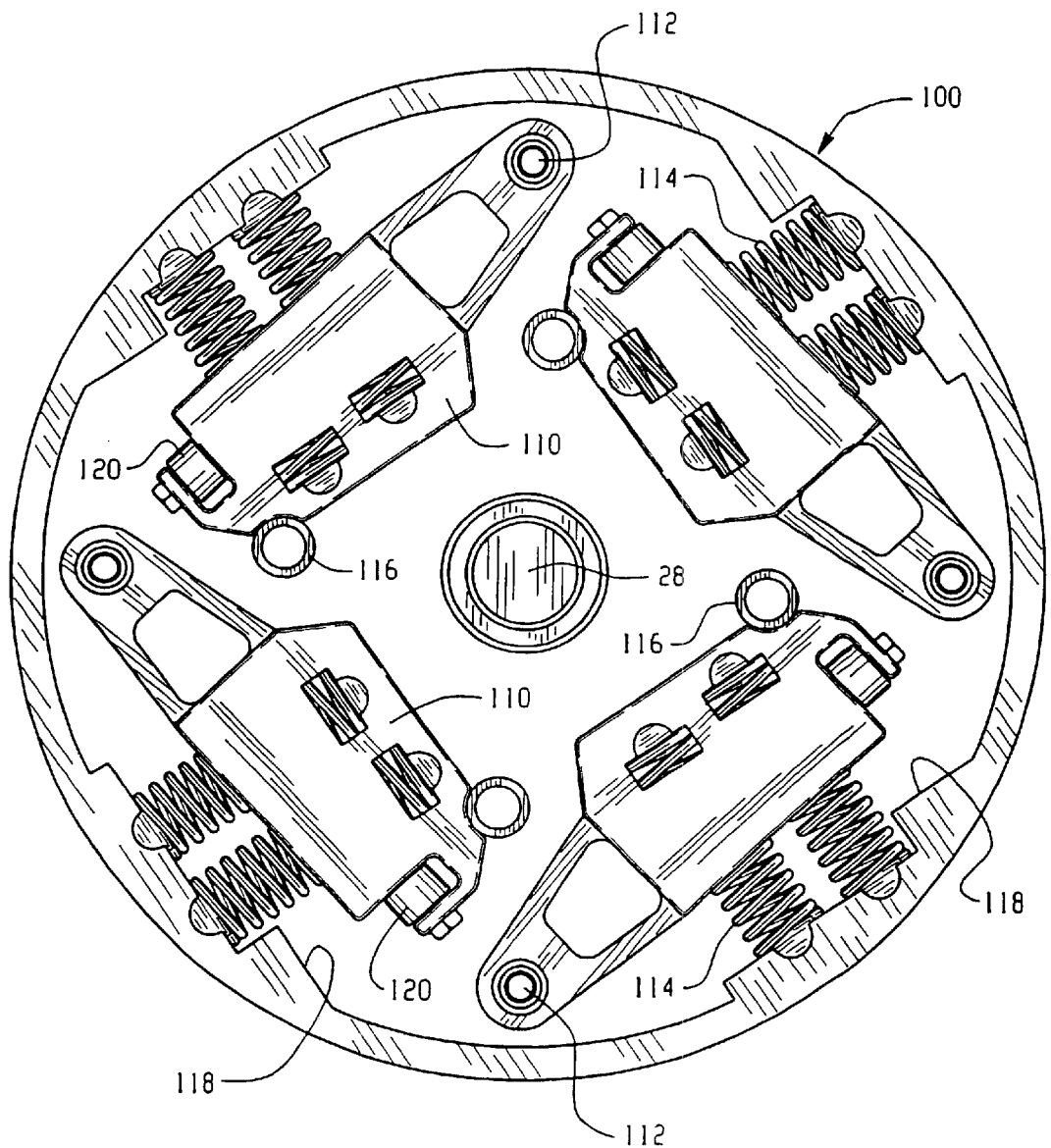
FIG. 4 is a partial top view, in section, of the cover and centrifugal mechanism of the clutch of the present invention.
Figure 6A:
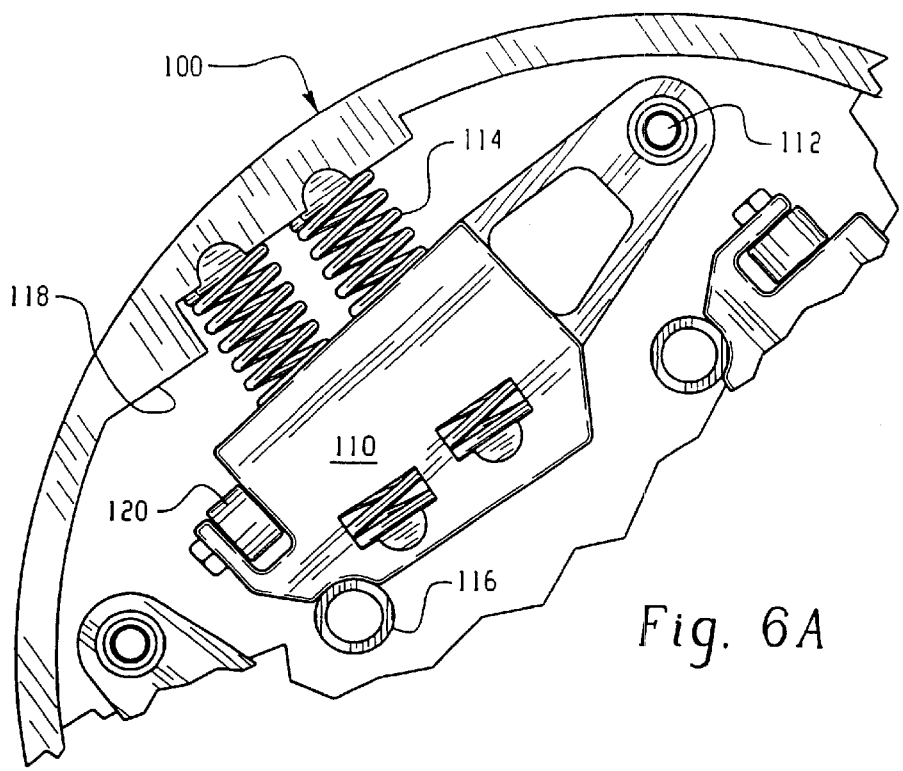
FIGS. 6A and 6B are partial sectional views illustrating the position of the flyweights in the fully radially inward clutch disengaged position and the fully radially outward clutch fully engaged position, respectively.
Figure 6B:
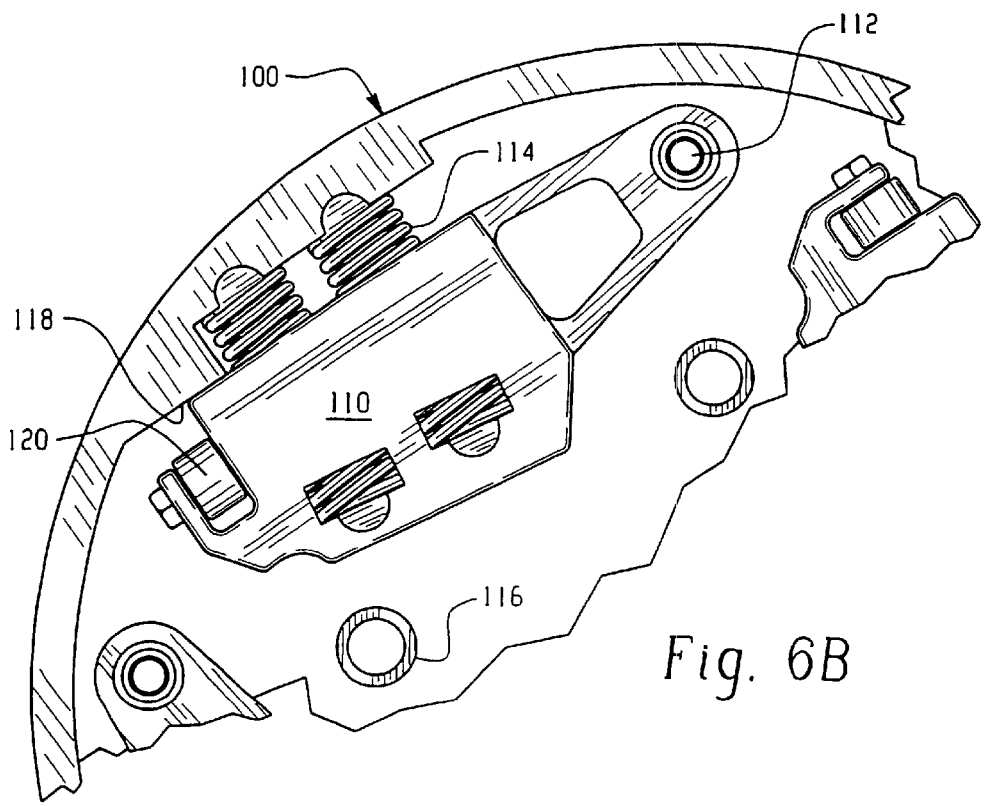

Since a centrifugal clutch provides increasing clutching force, (torque) with increasing rotational speed of the clutch, the algorithm uses the throttle pedal setting to maintain a desired engine speed limit which translates into a desired torque in the driveline. FIG. 3 illustrates a graph of target engine speeds for throttle pedal positions. By way of example, if the throttle is moved from a zero percent displacement to a fifty percent displacement, the engine will be commanded to quickly ramp from idle (about 600–650 RPM) to 750 RPM, which is the point of clutch incipient engagement, and then increase to 850 RPM in a slower modulated manner. Testing has shown that a quick ramp rate of about 500 RPM/SEC and a modulated ramp rate of about 200 RPM/SEC provide satisfactory results. A performance set of ramps, if the driver applies full (100%) throttle, may be utilized, such as, for example, 750 RPM/SEC to incipient engagement engine speed and then 250 RPM/SEC to target speed.

As used herein, an engine speed may be commanded directly by commanding a specific engine speed, indirectly by commanding an engine speed limit, or by commanding a related parameter such as an engine torque or engine torque limit.

For decreasing throttle position, engine speed is commanded to immediately equal the lower target value. As engine is fueled to the launch target value engine speed (such as 850 RPM at 50% throttle), and maintained at that value, while engine speed (ES) is compared to transmission input shaft speed (IS), to sense clutch slip (ES-IS). When clutch engagement without slip is sensed (ES-IS<RPM, REF equal about ±50 RPM), the engine will be commanded to ramp up to torque value corresponding to throttle pedal position and then control of fueling is returned to the operator. The ramp rates may be modified as a function of the start ratio being utilized, with quicker rates at higher start ratios ($3^{rd}$ or $4^{th}$) than at lower start ratios ($1^{st}$ or $2^{nd}$). Throttle recovery logic, the logic by which fuel control is returned to the operator may be seen by reference to U.S. Pat. Nos. 4,493,228 and 4,792,901, the disclosures of which are incorporated herein by reference.

The engine speed target ($ES_T$) need not be a linear function of throttle position and may vary with sensed system parameters such as, for example, start ratio, see line 82 in FIG. 3. The relationship may also be varied in response to sensed clutch wear, performance degradation or the like.

The engine controls of the present invention may also be subject to engine and/or driveline torque limitations of the types seen in U.S. Pat. Nos. 5,797,110; 6,052,638 and; 6,080,082, the disclosures of which are incorporated herein by reference.

The control will, preferably, include overheating protection, which can occur from constant slipping of the clutch under torque (i.e., driver trying to maintain a stopped position on a grade by slipping the clutch). This can be sensed in several ways, such as, for example, sensing if vehicle acceleration is less than a reference value ((dos/dt) <REF?) or by sensing or estimating a clutch temperature from sensed vehicle operating conditions, see U.S. Pat. No. 4,576,263, the disclosure of which are incorporated herein by reference.

Upon sensing a potential clutch over-heating problem, the control logic can react by increasing or decreasing engine RPM. If engine RPM is increased, the clutch will engage causing the operator to use a different method of maintaining vehicle position. If the engine speed is decreased, the driver will increase throttle position, which should cause increased engine speed and then clutch lockup. To reduce the likelihood of using a slipping clutch to maintain a stopped position on a grade, the system could incorporate a hill hold device 160. The hill hold device would be controlled by ECU 50 and applied when the clutch was disengaged and the indicated vehicle speed was zero. The hill hold would be released when the throttle was applied and generated torque reached a predetermined level. Such hill holding devices may, by way of example, be a separate brake or retarding device or may utilize the vehicle foundation brakes.

In an alternate embodiment, a quick release 200 mechanism may be provided. This mechanism may be desirable in situations where upshifting on a severe grade (greater than 15% or 20%) may be required.

Accordingly, it may be seen that a new and improved control method/system for a transmission system and centrifugal master friction clutch is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling a vehicular automated transmission system (10) comprising an internal combustion engine (18) having an engine output member (136), an engine controller (38) having at least one mode of operation for controlling engine fueling to control at least one of engine speed (ES) and engine torque (ET), a multiple speed change gear transmission (14) having an input shaft (28), a centrifugal friction clutch (20) for drivingly connecting said engine output member to said input shaft, a manually operated throttle (37) for manually requesting a degree of engine fueling, a system controller for receiving input signals (54) including two or more of signals of (i) engine speed (ES), (ii) throttle position (THL), (iii) engaged transmission ratio (GR), (iv) input shaft speed (IS), (v) vehicle speed (OS) and (vi) engine torque (ET), and processing said signals according to logic rules to issue command output signals (56) to system actuators including at least said engine controller, said method characterized by the steps of:

(a) providing said centrifugal clutch with a driving member (60) rotatable with said engine output member and with a driven member (62) rotatable with said output shaft;

(b) configuring said centrifugal clutch to have its engagement dependent upon the rotational speed of said driving member, said clutch being disengaged at engine idle speed, said clutch becoming incipiently engaged at an incipient engagement engine speed ($ES_{IE}$) greater than said engine idle speed ($ES_{IE} < ES_{IDLE}$), said clutch achieving a maximum engagement (74/64) at at least a lockup engine speed ($ES_{LOCKUP}$), said lockup engine speed greater than said incipient engagement engine speed ($ES_{LOCKUP} < ES_{IE}$);

(c) sensing vehicle launch conditions;

(d) during vehicle launch conditions continuously:
  (i) sensing throttle position,
  (ii) determining a target engine speed ($ES_T$) as a function of sensed throttle position with said target engine speed being less than said lockup engine speed ($ES_T < ES_{LOCKUP}$), and
  (iii) commanding engine speed to equal said target engine speed.

2. The control method of claim 1 including the additional step, after step (d) (iii):

(e) upon sensing substantial centrifugal friction clutch lockup (ES=IS plus or minus about 50 RPM), determining that vehicle launch conditions cease to exist and commanding a throttle recovery mode of engine fuel control to return control of engine fueling to the operator.

3. The method of claim 2 wherein said transmission has one or more start ratios and said vehicle launch conditions are sensed if (i) said transmission is engaged in a start ratio, (ii) vehicle speed is less than a reference value (OS<REF) and (iii) said master friction clutch is not engaged.

4. The method of claim 2 wherein said clutch remains at maximum engagement at a disengagement engine speed ($ES_{DISENGAGE}$) less than said lockup engine speed and less than a minimum expected engine speed ($ES_{MIN}$) expected after an upshift ($ES_{LOCKUP} < ES_{DISENGAGE}$ and $ES_{MIN} < ES_{DISENGAGE}$); and if throttle position is greater than a minimum value (THL<$THL_{MIN}$), said target engine speed is determined to be equal to or greater than said incipient engagement engine speed and less than said lockup engine speed ($ES_{IE} \leq ES_T < ES_{LOCKUP}$).

5. The control method of claim 2 wherein:

(a) if target engine speed is at least as great as said incipient engagement engine speed ($ES_T \geq ES_{IE}$) and sensed engine speed is less than said incipient engagement engine speed (ES<$ES_{IE}$), causing engine speed to increase to said incipient engagement engine speed at a first rate of increase, and (b) if sensed engine speed is at least as great as said incipient engagement engine speed (ES$\geq ES_{IE}$) and sensed engine speed is less than said target engine speed (ES<$ES_T$), causing engine speed to increase to said target engine speed at a second rate of increase, said first rate of increase greater than said second rate of increase.

6. The control method of claim 5 wherein if sensed engine speed exceeds target engine speed (ES$\geq ES_T$), engine speed is commanded to immediately equal said target engine speed.

7. The control method of claim 5 wherein, if sensed throttle position is at a substantially maximum value, (c) if target engine speed is at least as great as said incipient engagement engine speed ($ES_T \geq ES_{IE}$) and sensed engine speed is less than said incipient engagement engine speed (ES<$ES_{IE}$), causing engine speed to increase to said incipient engagement engine speed at a third rate of increase, said third rate of increase greater than said first rate of increase.

8. The control method of claim 5 wherein, if sensed throttle position is at a substantially maximum value,
   (d) if sensed engine speed is at least as great as said incipient engagement engine speed ($ES \geq ES_{IE}$) and sensed engine speed is less than said target engine speed ($ES<ES_T$), causing engine speed to increase to said target engine speed at a fourth rate of increase, said fourth rate of increase greater than said second rate of increase.

9. The method of claim 1 wherein said clutch remains at maximum engagement at a disengagement engine speed ($ES_{DISENGAGE}$) less than said lockup engine speed and less than a minimum expected engine speed ($ES_{MIN}$) expected after an upshift ($ES_{LOCKUP}<ES_{DISENGAGE}$ and $ES_{MIN}<ES_{DISENGAGE}$); and
   if throttle position is greater than a minimum value ($THL<THL_{MIN}$), said target engine speed is determined to be equal to or greater than said incipient engagement engine speed and less than said lockup engine speed ($ES_{IE} \leq ES_T<ES_{LOCKUP}$).

10. The control method of claim 1 wherein target engine speed is also determined as a function of one of sensed wear and clutch temperature.

11. The control method of claim 1 further comprising the steps, during vehicle launch condition, of:
    (iv) determining an estimated clutch operating temperature;
    (v) comparing said estimated operating temperature to a reference temperature value; and
    (vi) if said operating temperature exceeds said reference temperature value, commanding a clutch protection action.

12. The control method of claim 11 wherein said estimated clutch operating temperature is determined as a function of at least one of clutch slip (ES-IS) and clutch torque.

13. The control method of claim 1 wherein:
    (a) if target engine speed is at least as great as said incipient engagement engine speed ($ES_T \geq ES_{IE}$) and sensed engine speed is less than said incipient engagement engine speed ($ES<ES_{IE}$), causing engine speed to increase to said incipient engagement engine speed at a first rate of increase, and
    (b) if sensed engine speed is at least as great as said incipient engagement engine speed ($ES \geq ES_{IE}$) and sensed engine speed is less than said target engine speed ($ES<ES_T$), causing engine speed to increase to said target engine speed at a second rate of increase, said first rate of increase greater than said second rate of increase.

14. The control method of claim 13 wherein if sensed engine speed exceeds target engine speed ($ES \geq ES_T$), engine speed is commanded to immediately equal said target engine speed.

15. The control method of claim 13 wherein, if sensed throttle position is at a substantially maximum value,
    (c) if target engine speed is at least as great as said incipient engagement engine speed ($ES_T \geq ES_{IE}$) and sensed engine speed is less than said incipient engagement engine speed ($ES<ES_{IE}$), causing engine speed to increase to said incipient engagement engine speed at a third rate of increase, said third rate of increase greater than said first rate of increase.

16. The control method of claim 13 wherein, if sensed throttle position is at a substantially maximum value,
    (d) if sensed engine speed is at least as great as said incipient engagement engine speed ($ES \geq ES_{IE}$) and sensed engine speed is less than said target engine speed ($ES<ES_T$), causing engine speed to increase to said target engine speed at a fourth rate of increase, said fourth rate of increase greater than said second rate of increase.

17. The method of claim 1 wherein said transmission has one or more start ratios and said vehicle launch conditions are sensed if (i) said transmission is engaged in a start ratio, (ii) vehicle speed is less than a reference value (OS<REF) and (iii) said master friction clutch is not engaged.

18. A control system for controlling a vehicular automated transmission system (10) comprising:
    an internal combustion engine (18) having an engine output member (136);
    an engine controller (38) having at least one mode of operation for controlling engine fueling to control at least one of engine speed (ES) and engine torque (ET), a multiple speed change gear transmission (14) having an input shaft (28);
    a centrifugal friction clutch (20) for drivingly connecting said engine output member to said input shaft, said centrifugal clutch having a driving member (60) rotatable with said engine output member and a driven member (62) rotatable with said input shaft, said centrifugal clutch being configured to have its engagement dependent upon the rotational speed of said driving member, said clutch being disengaged at an engine idle speed ($ES_{IDLE}$), said clutch becoming incipiently engaged at an incipient engagement engine speed ($ES_{IE}$) greater than said engine idle speed ($ES_{IE}>ES_{IDLE}$), said clutch achieving a maximum engagement (74/76) at at least a lockup engine ($ES_{LOCKUP}$), said lockup engine speed greater than said incipient engagement engine speed ($ES_{LOCKUP}<ES_{IE}$);
    a manually operated throttle (37) for manually requesting a degree of engine fueling;
    a system controller for receiving input signals (54) including two or more of signals of (i) engine speed (ES), (ii) throttle position (THL), (iii) engaged transmission ratio (GR), (iv) input shaft speed (IS), (v) vehicle speed (OS) and (vi) engine torque (ET), and processing said signals according to logic rules to issue command output signals (56) to system actuators including at least said engine controller, said control system characterized by said system controller having logic rules effective for:
    (a) sensing vehicle launch conditions;
    (b) during vehicle launch conditions, continuously:
       (i) sensing throttle position,
       (ii) determining a target engine speed ($ES_T$) as a function of sensed throttle position with said target engine speed being less than said lockup engine speed ($ES_T<ES_{LOCKUP}$), and
       (iii) commanding engine speed to equal said target engine speed.

19. The control system of claim 18 wherein said logic rules are additionally effective, during vehicle launch conditions, for:
    (c) upon sensing substantial centrifugal friction clutch lockup (ES=IS plus or minus about 50 RPM), determining that vehicle launch conditions cease to exist and commanding a throttle recovery mode of engine fuel control to return control of engine fueling to the operator.

20. The control system of claim 19 wherein said transmission has one or more start ratios and said vehicle launch conditions are sensed if (i) said transmission is engaged in a start ratio, (ii) vehicle speed is less than a reference value (OS<REF) and (iii) said master friction clutch is not engaged.

21. The control system of claim 18 wherein said transmission has one or more start ratios and said vehicle launch conditions are sensed if (i) said transmission is engaged in a start ratio, (ii) vehicle speed is less than a reference value (OS<REF) and (iii) said master friction clutch is not engaged.

22. The control system of claim 18 wherein target engine speed is also determined as a function of one of sensed clutch wear and clutch temperature.

* * * * *